March 1, 1966    R. K. ZIEGLER ET AL    3,237,960
DOLLY FOR CAMPER'S TRAILER
Filed Aug. 14, 1964
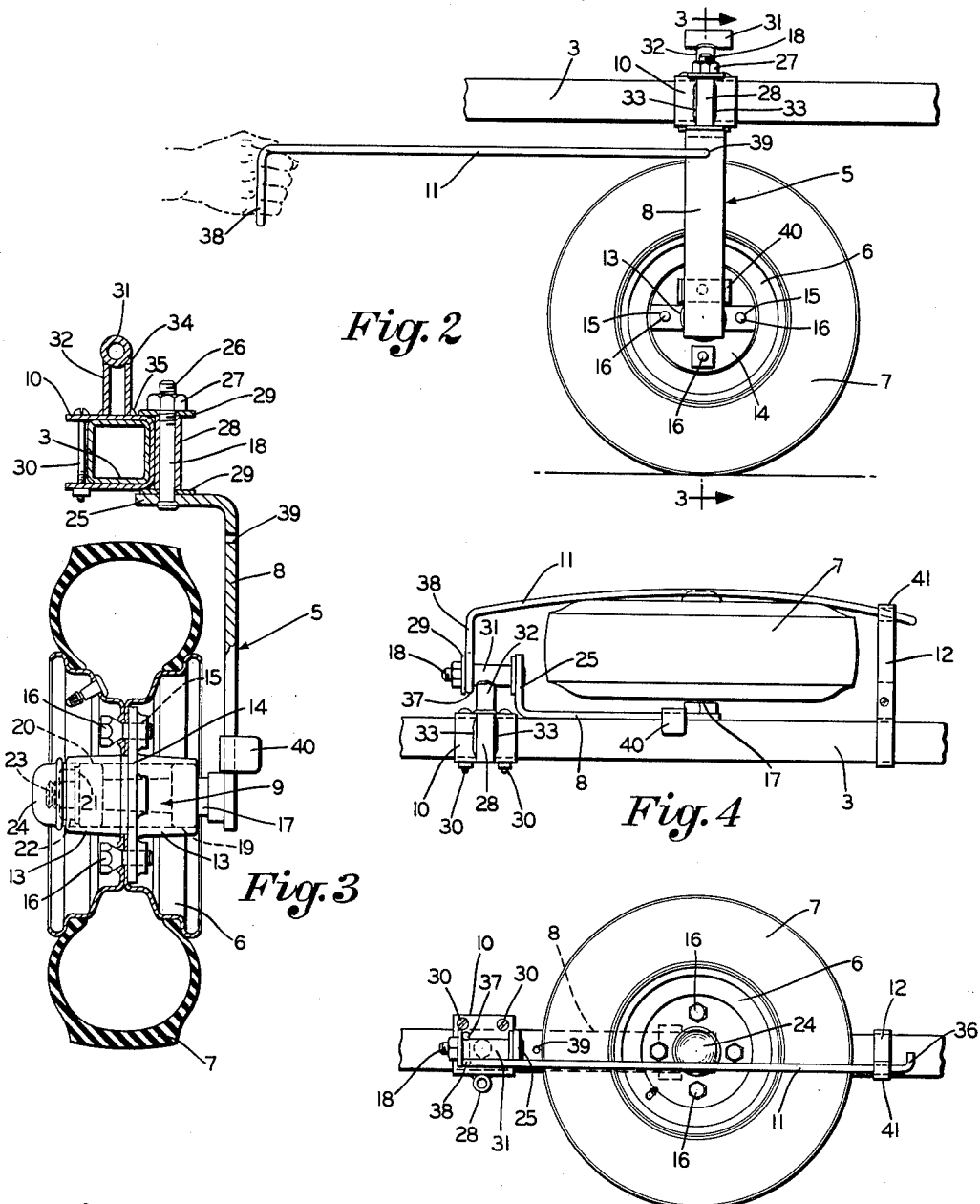
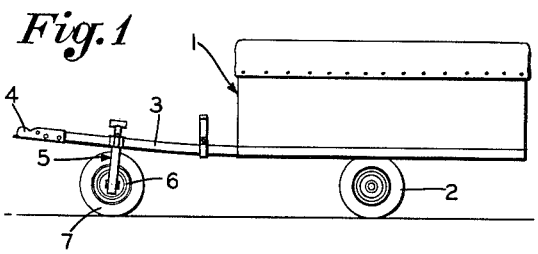
INVENTORS
Richard K. Ziegler and
Hubert N. Brown
BY
Frease, Bishop, Johns & Schick
ATTORNEYS United States Patent Office 3,237,960
Patented Mar. 1, 1966

3,237,960
DOLLY FOR CAMPER'S TRAILER
Richard K. Ziegler and Hubert N. Brown, both of
2151 E. State St., Salem, Ohio
Filed Aug. 14, 1964, Ser. No. 389,620
6 Claims. (Cl. 280—84)

This invention relates to a dolly for use with a trailer when disconnected from a towing vehicle.

Most of the trailers and other wheeled vehicles having a tongue for attachment to a towing vehicle are balanced over an axle and wheels in order to reduce the load on the towing vehicle. When the trailer is disconnected from the vehicle, it is usually too cumbersome and heavy for easy manipulation. This particularly true with regard to boat trailers, camping trailers, and the like where the user frequently disconnects the trailer from the vehicle.

Associated with the foregoing is the problem of manually manipulating a trailer after being disconnected into a desirable location. With the increasing use of camper's trailers the problem is particularly acute because such trailers are preferably placed on level terrain and often require extensive manipulation. In addition, a spare tire is normally provided with each trailer. Such tires are sometimes mounted in awkward or inconvenient places.

It has been found that the foregoing difficulties may be overcome by providing a dolly for a trailer which also serves as a means for storing a spare tire. Such a dolly is provided with a mounting bracket adapted to mount the dolly on the tongue as a spare tire holder, and also mounts the dolly on the tongue for use as a dolly when maneuvering the trailer into a desired location.

Accordingly, it is a general object of this invention to provide a dolly for a camper's trailer which serves as a means for storing a spare tire.

It is another object of this invention to provide a dolly for a camper's trailer which is used alternately as a dolly and a spare tire bracket.

It is another object of this invention to provide a device which is mounted on the forward end of a tongue of a trailer and which is adapted to hold a tire either in a spare tire position or as a dolly.

Finally, it is an object of this invention to provide an improved dolly for a camper's trailer which accomplishes the foregoing objects and desiderata in a simple and effective manner.

These and other objects and advantages apparent to those skilled in the art from the following description and claims may be obtained, the stated results achieved, and the described difficulties and problems overcome and solved by the parts, elements, constructions, mechanisms, combinations, subcombinations and arrangements, which comprise the present invention, the nature of which is set forth in the following general statement, a preferred embodiment of which—illustrative of the best mode in which applicants have contemplated applying the principles—is set forth in the following description and shown in the drawings, and which is particularly and distinctly pointed out and set forth in the appended claims forming part hereof.

The improved dolly construction for a trailer of the present invention may be stated in general terms as including a caster unit detachably mounted on the forwardly projecting tongue of a trailer, means for detachably mounting the unit in one of two positions including a retracted position and an extended position, the means including a C-shaped clamp having upper, lower, and intermediate walls, the clamp being secured on the tongue and having a vertical sleeve mounted on one wall and a horizontal sleeve mounted on another wall, a wheel-mounting bracket having a stub shaft at one end and a pivot pin at the other end, the pin and the shaft extending perpendicular to each other, a wheel mounted on the stub shaft, the pivot pin being alternately secured in the horizontal sleeve and the vertical sleeve when the caster unit is in the retracted and extended positions respectively, the wheel being disposed in a horizontal position on the tongue in the retracted position, the wheel being disposed in a vertical position for supporting the tongue in the extended position, the unit also including a hold-down bracket attached to the tongue and spaced from the clamp, a caster turning rod having an outturned end portion at one end and a hooked portion at the other end, the hooked end portion being secured to the horizontal sleeve and the other end portion being secured to the bracket and the intermediate rod portion extending over the wheel in the retracted position, and the rod being composed of steel and held in arcuate position between the clamp and the bracket.

Referring to the drawing forming a part hereof in which the preferred embodiment is shown by way of example:

FIGURE 1 is a side view of a trailer having a dolly attached to the forward end of the tongue;

FIG. 2 is an enlarged side view of the dolly mounted on the tongue and showing the manner in which the dolly is manually manipulated with a turning rod;

FIG. 3 is a vertical sectional view taken on the line 3—3 of FIG. 2 showing the dolly in the extended position;

FIG. 4 is a side view of the dolly in the retracted or storing position on the tongue; and FIG. 5 is a plan view of the dolly in the position of FIG. 4.

Similar numerals refer to similar parts throughout the several views of the drawing.

In FIG. 1 a trailer such as a camper's trailer is generally indicated at 1. It includes conventional wheels 2, a tongue 3, and a hitch socket 4 for attachment to a towing vehicle. A dolly 5 is mounted on the forward end of the tongue 3 for holding the tongue upright when the hitch socket is disconnected. The dolly includes a wheel 6 having a tire 7, an L-shaped arm 8, a wheel-mounting frame 9, and a C-shaped clamp 10. The dolly also includes a turning rod 11 and a bracket 12.

The tongue 3 is preferably composed of heavy gauge sheet metal. It has a rectangular cross section as shown in FIG. 3.

The tire 7 and wheel 6 are of conventional construction and are mounted on the frame 9 which includes a cylindrical hub 13 and a radial flange 14. The flange and hub form an integral unit. As shown in FIG. 2 the flange 14 is provided with four equally spaced threaded apertures 15 which are aligned with corresponding apertures on the wheel 6. Bolts 16 hold the wheel on the flange. The wheel 6 corresponds to wheels 2 under the trailer and is used as a spare tire unit for the trailer in the event of an emergency.

As shown in FIG. 3 the L-shaped arm 8 has a wheel-mounting stub shaft 17 attached to the lower end thereof, and a pivot pin 18 is secured to the upper end thereof and extends perpendicular to the shaft 17. The shaft 17 mounts the wheel 6 in place and extends through the center of the cylindrical hub 13 where it is held by a pair of spaced bearings 19 and 20, a washer 21, and a nut 22 which is attached to a threaded end 23 of the shaft. An end cap 24 is seated within the hub 13 and over the threaded end 23 and the nut 22.

The pivot pin 18 is secured to the upper outturned portion 25 of the L-shaped arm 8. The upper end of the pin includes a threaded portion 26 to which a nut 27 is attached. As shown in FIG. 3 the pin 18 is seated in a vertical sleeve 28 and the entire dolly is free to rotate about the axis of the pin 18. The upper and lower ends of the sleeve are provided with reinforcing washers 29.

The C-shaped clamp 10 is secured to the tongue 3 by a pair of spaced nut and bolt units 30. In addition to the vertical sleeve 28 the clamp includes a horizontal sleeve 31 which is secured to the upper end of a tubular member 32. As shown in the drawing the sleeve 28 is secured to the side of the clamp by welds 33, the horizontal sleeve 31 is secured to the upper end of the member 32 by a weld 34, and the lower end of the member 32 is secured to the upper side of the clamp by a weld 35.

In FIGS. 1–3 the device is used as a dolly only when the hitch socket 4 is disconnected from a towing vehicle. For that purpose the pin 18 is inserted into the sleeve 28 from the underside and the bolt 27 is attached as shown. The weight of the trailer 1 is borne by the wheels 2 and the dolly 5. The rod 11 is used to turn the dolly in order to manipulate the trailer 1. The rod 11 has an outturned end portion 36 (FIG. 5) and a hooked end portion 37 at the other end which is at the other end which is at the extremity of an outturned portion 38. The arm 8 is provided with an aperture 39 (FIG. 3) in which the end portion 36 of the rod is inserted. By grasping the outturned portion 38 with one hand the operator can turn the dolly by pulling or pushing on the rod 11.

When the hitch socket 4 is attached to a towing vehicle the dolly is no longer useful in the extended position of FIGS. 1–3. The dolly is then placed in the retracted or storage position as shown in FIGS. 4 and 5. In that position the pin 18 is secured in the horizontal sleeve 31 with the arm 8 extending along the top side of the tongue 3. A U-shaped mounting bracket 40 is mounted on the lower end of the arm 8 near the shaft 17 which bracket straddles opposite sides of the tongue 3 for preventing lateral shifting of the dolly when it is in the storage or retracted position of FIG. 4.

To prevent the dolly from bouncing upwardly out of position on the tongue the hooked portion 37 of the rod is secured around the underside of the horizontal sleeve 31 and the opposite end portion is placed under an upper hooked end portion 41 of the bracket 12. Thus, the rod extends across the upper side of and in contact with the tire 7 and is flexed between the sleeve 31 at the bracket 12 by the tire 7. The pressure of the flexed rod 11 pulls the dolly arm 8 simultaneously in place on the top surface of the tongue 3.

The device of the present invention provides an improved dolly which serves as a spare tire mounting bracket as well as a tongue support for a trailer. During normal travel of the trailer the entire unit is mounted on the trailer tongue and secured in place by the flexible metal rod. When the trailer is disconnected from the towing vehicle the device is used as a dolly to facilitate manipulation of the trailer.

The spare tire unit including the tire, wheel, hub, bearings, and grease seals are interchangeable with those of the wheel units used to haul the trailer. Thus, if a bearing requires replacement, one is available in the spare tire unit.

In the foregoing description certain terms have been used for brevity, clearness and understanding, but no unnecessary limitations are to be implied therefrom as such words are used for descriptive purposes and are intended to be broadly construed.

Moreover, the embodiment of the improved construction illustrated and described herein is by way of example and the scope of the present invention is not limited to the exact construction shown.

Having now described the invention, construction, operation and use of a preferred embodiment thereof and the advantageous, new and useful results obtained thereby; the new and useful dolly for camper's trailer and reasonable mechanical equivalents thereof obvious to those skilled in the art are set forth in the appended claims.

What is claimed is:

1. A detachable dolly for a trailer having a tongue adapted for connection to a towing vehicle, including a caster wheel unit having a pivot pin at the upper end thereof, means for pivotally mounting the unit in an extended position below an associated tongue and for mounting the unit in a retracted position above the tongue, said means including a vertical sleeve for receiving the pivot pin with the unit in the extended position and including a horizontal sleeve for receiving the pin with the unit in the retracted position, and a retaining rod means for holding the unit on the tongue in the retracted position.

2. A detachable dolly for a trailer having a tongue adapted for connection to a towing vehicle, including a caster wheel unit having a pivot pin at the upper end thereof, a mounting bracket on the tongue and having a vertical sleeve for holding the pivot pin when the unit is in an extended position below an associated tongue, the bracket also including a horizontal sleeve for receiving the pivot pin when the unit is in the retracted position on the tongue, and a steering rod attachable to the caster wheel unit when the unit is in the extended position.

3. A detachable dolly for a trailer having a tongue adapted for connection to a towing vehicle, including a caster wheel unit having a mounting arm, a pivot pin at the upper end of the arm, a stub shaft at the other end of the arm, rotatable wheel mounting means on the shaft, a wheel unit detachably mounted on the rotatable wheel mounting means, and means for detachably mounting the unit on an associated trailer tongue and including a pin-receiving vertical sleeve for pivotally mounting the unit in the extended position and including a pin-receiving horizontal sleeve for holding the unit in the storage position on the tongue.

4. A detachable dolly for a trailer having a tongue adapted for connection to a towing vehicle, including a caster wheel unit and mounting means for holding the unit in an extended position under the tongue and in an alternate horizontal position above the tongue, the unit including a mounting arm having a stub shaft at the lower end thereof and having wheel mounting means rotatably secured on the shaft, a wheel detachably mounted on the wheel mounting means, a pivot pin at the upper end of the mounting arm for attachment in one position on the mounting means for holding the unit in the extended position for supporting the tongue, and the pivot pin being attachable to the mounting means in said alternate position for mounting the unit in the storage position above the tongue.

5. The construction of claim 4 in which the mounting unit includes clamping rod means for holding the wheel unit on the tongue in the storage position.

6. The construction set forth in claim 5 in which the clamping rod means includes a rod for holding the wheel unit on the tongue in the storage position, and for steering the unit in the extended position.

References Cited by the Examiner

UNITED STATES PATENTS

| | | | |
|---|---|---|---|
| 1,193,052 | 8/1916 | Pirsch | 280—84 |
| 2,627,424 | 2/1953 | Chapin | 280—150.5 |
| 2,810,588 | 10/1957 | Rozett | 280—150.5 X |
| 2,954,963 | 10/1960 | Berg | 280—150.5 |
| 2,962,298 | 11/1960 | Hefling | 280—150.5 |

FOREIGN PATENTS

| | | |
|---|---|---|
| 510,392 | 7/1939 | Great Britain. |
| 1,082,494 | 6/1954 | France. |

KENNETH H. BETTS, *Primary Examiner.*